UNITED STATES PATENT OFFICE.

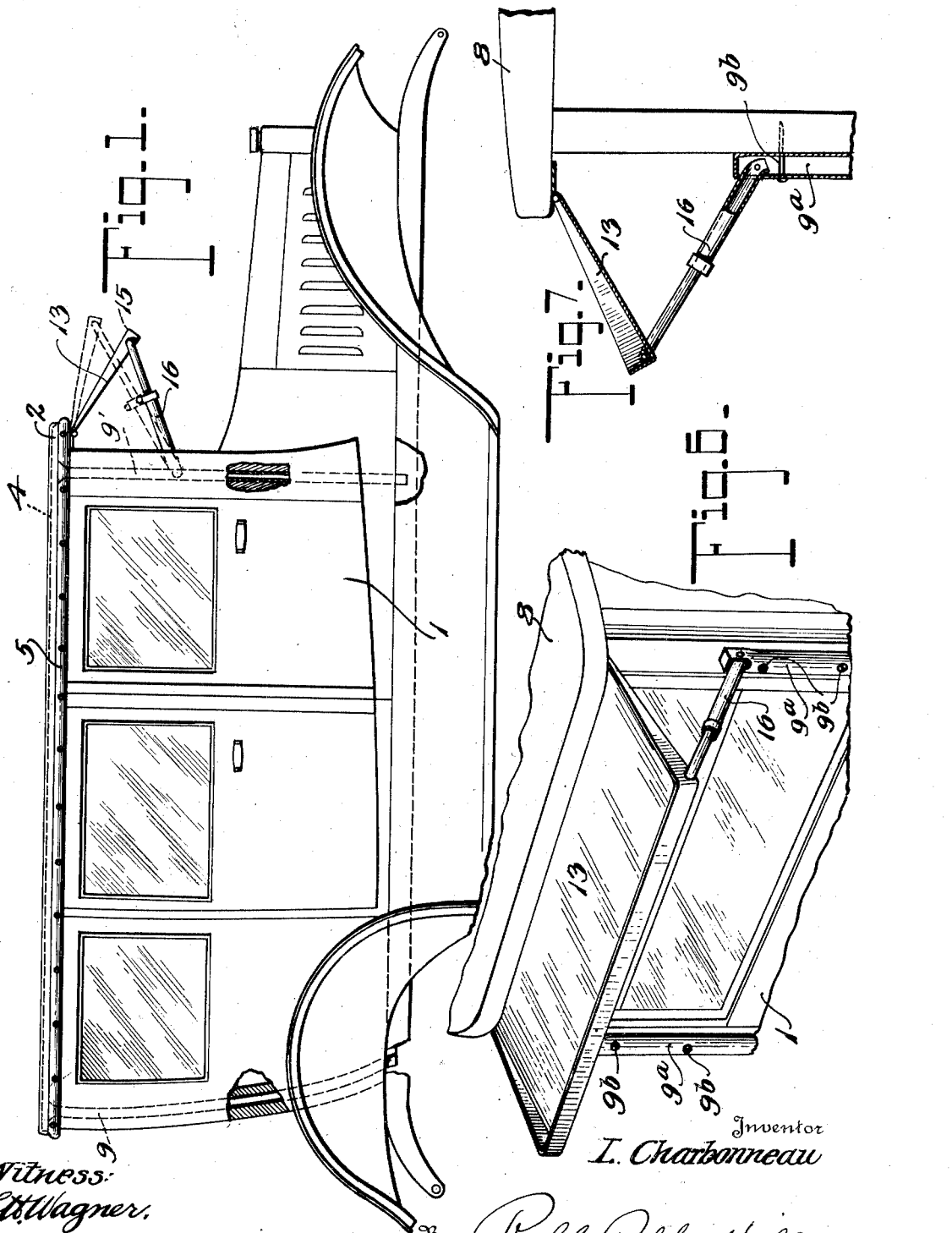

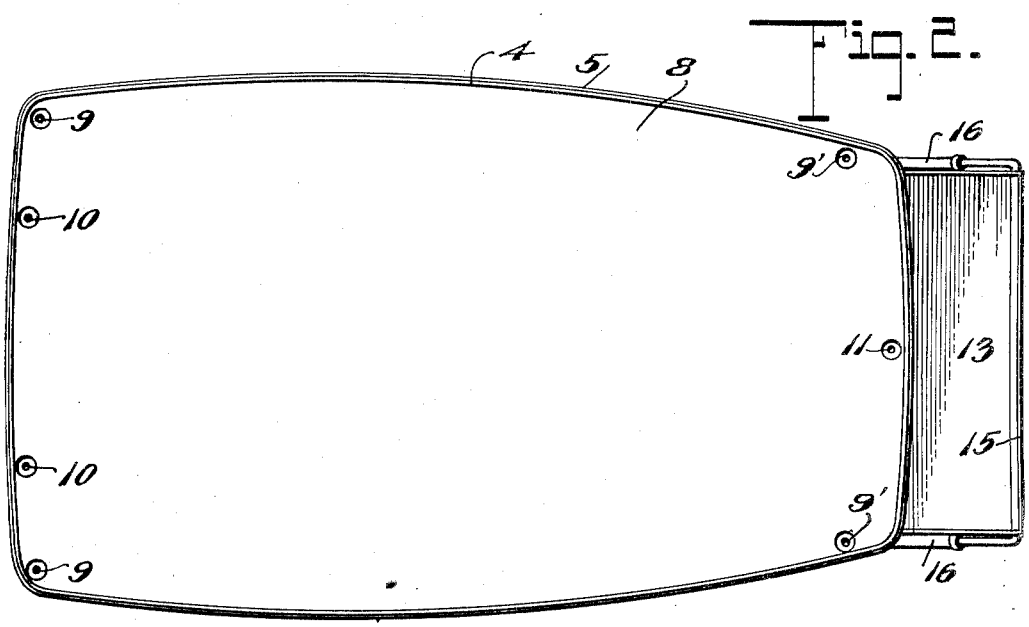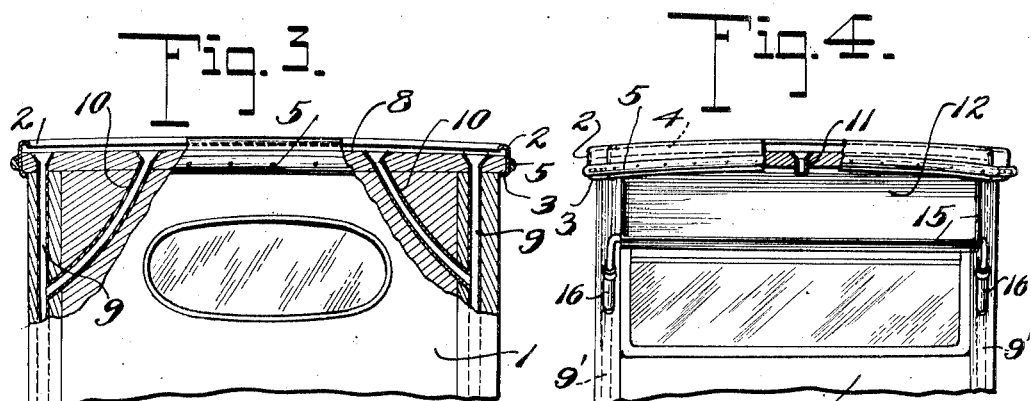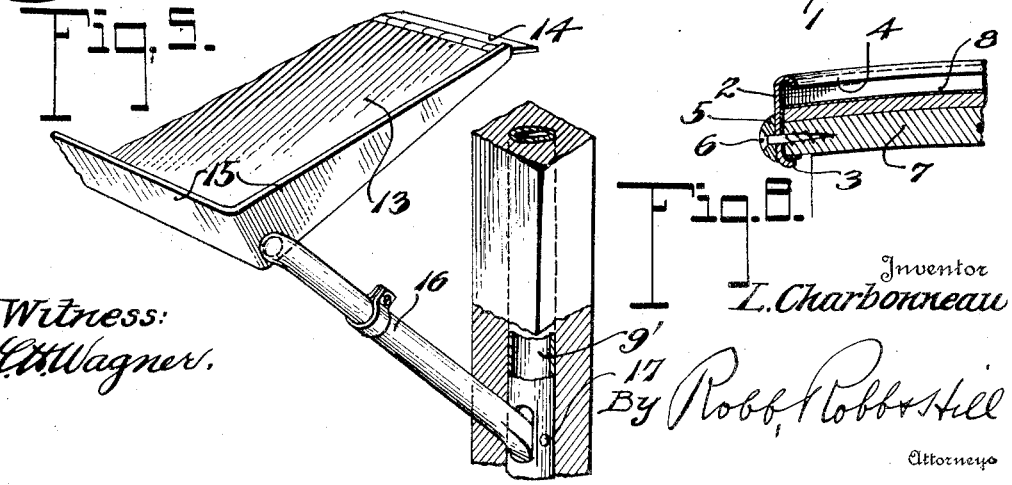

LEONARD CHARBONNEAU, OF OGDENSBURG, NEW YORK.

DRAINAGE SYSTEM FOR VEHICLES.

1,415,794. Specification of Letters Patent. Patented May 9, 1922.

Application filed July 26, 1921. Serial No. 487,639.

*To all whom it may concern:*

Be it known that I, LEONARD CHARBONNEAU, a citizen of the United States, residing at Ogdensburg, in the county of St. Lawrence and State of New York, have invented certain new and useful Improvements in Drainage Systems for Vehicles, of which the following is a specification.

The present invention relates to improvements in drainage systems for vehicles and is especially designed for attachment to or incorporation in the structure of automobiles having closed or limousine bodies.

It is quite well known that considerable inconvenience is experienced in connection with the dripping or running of water from the tops of vehicle bodies over the window panes at the sides thereof or onto persons getting into and out of the vehicle, and it is especially troublesome so far as the windshield is concerned, through the sections of which the water is blown due to the movement of the vehicle and the carrying of the drops of water by the air induced by the travel. Manufacturers have resorted to different expedients to overcome this difficulty which involves usually an element of danger at times due to impairment of the vision of the driver. One of the methods employed is to provide an extra shield arranged at an incline at the top of the usual windshield so as to project forwardly, but this is only slightly helpful because the water is still free to splash back from the lower edge of the vizor onto the main shield. Again, it has been proposed to attach drains to the sides of the top so as to catch drippings, but this is also but partially successful.

It has therefore been my aim to devise a complete drainage system which will be fully effective in that the water will be entirely carried off the vehicle by a simple arrangement of drainage troughs, so called, and tubing which may be readily and cheaply embodied in the vehicle structure.

A further object in view is to provide as a part of the equipment of a vehicle a vizor or shade of the type indicated in the form of an attachment, the supports for which are so formed as to permit of adjustment and at the same time constitute drainage members or conveying means for conducting the water to points of discharge relatively distant from the shield, or as the case may be, into the main drainage system for the vehicle top.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a side elevation of a vehicle body having my drainage system incorporated therein, portions being broken away to disclose the down-spouts at either end of the vehicle side.

Figure 2 is a top plan view.

Figure 3 is a fragmentary rear elevation of the vehicle top, portions being broken away and shown in sections to disclose the arrangement of drain tubes at the rear end of the vehicle.

Figure 4 is a fragmentary front elevation of the vehicle top, likewise broken away to show the details of construction.

Figure 5 is a fragmentary perspective view of the vizor construction contemplated as a feature of my drainage system.

Figure 6 is a perspective view of the vizor feature constructed as an accessory or attachment for vehicles not originally provided with drainage systems as described.

Figure 7 is a sectional view of the attachments shown in Figure 6.

Figure 8 is an enlarged fragmentary sectional view showing more clearly the form of the top trough or flange forming an element of the drainage system.

Throughout the following detailed description and on the several figures of the drawing, similar parts are referred to by like reference characters.

Referring to the drawings, 1 indicates a closed vehicle body of the type in which my invention is designed to be embodied. About the edge of the top of the body I secure a specially constructed flange piece or trough which is most clearly shown in Figure 8 of the drawings to consist of a narrow strip of metal 2 having its lower longitudinal edge rolled to provide a lower flange which engages about the under edge of the vehicle top as indicated at 3, the upper longitudinal edge of the metal strip being rolled over to provide the overhanging splash-preventing flange 4. This strip of metal is attached in any desired manner as, for example, by means of the bead strip 5 and the fastening screws 6 passing therethrough and through the metal strip into the vehicle top 7. This arrangement may be employed for securing the cloth usually extending over the top of the vehicle to the top as clearly shown in Figure 8, and thus it performs a dual function, the waterproof fabric 8 serving to prevent the water from passing between the strip 2 and top 7 or, in other words, acting as a gasket.

It will be apparent that the water falling upon the upper surface of the vehicle top, owing to its curvature, will drain to the edges thereof where it will be prevented from running off or splashing over the edge by virtue of the extension of the strip 2 above the surface and also by virtue of the overhanging flange 4.

The water is carried off from the top surface of the vehicle by drainage tubes, any suitable number of which may be provided, but as shown in the drawings illustrative of my system, I prefer to provide a downspout 9 at either side of the rear end of the vehicle body, which spouts lead to a point at least as low as the chassis of the vehicle from which the water will be discharged upon the ground. To most effectively carry off the water which tends to accumulate at the rear of the body owing to the effect of the travel of the vehicle upon the water, I contemplate that branch tubes 10 may be employed leading from intermediate points in the rear edge of the top to the downspouts 9 with which they connect at some convenient point between the ends.

At the forward end of the vehicle I similarly provide down-spouts 9′ and at this end a single intermediate drain spout 11 arranged centrally of the top will be sufficient to carry the water from this point. This spout 10 is quite short in length and drains upon the protector shield or vizor 12 which will now be described.

A drainage system for vehicles is hardly complete unless a protective device is employed to prevent the water from running down the windshield, and for this purpose I employ the vizor construction shown clearly in Figure 5 to consist of the member 13 which may be suitably colored to prevent reflection and provided at its top edge with a strip or similar means 14 for connecting it to the vehicle top. At the lower and side edges the member 13 is provided with a suitable flange 15 extending thereabout and serving to collect the water which drains from the vehicle top or falls upon the surface of the member 13 from which it is conveyed by means of the supporting members 16 to the front down-spouts 9′. The particular construction of these elements 16 it will be understood serves in a dual capacity in that they are tubular and are adjustable to enable the vizor to be positioned properly and convey the water to the down spout drains from which it is discharged at points relatively distant from the windshield. These supporting members 16 may be pivotally connected to the spout arrangement as at 17 or otherwise secured in position to best serve the purposes intended.

This arrangement of the drainage system above described will very adequately prevent any of the water falling upon the upper surface of the vehicle top from interfering with the vision through the windows or from dropping upon the occupants of the vehicle in getting into and out of the same. The arrangement of the upper troughs or flanges 2 is such that the motion of the vehicle will preclude the water from being splashed over, a feature which is not overcome by the customary type or form of drainage elements now in use.

As hereinbefore premised, I contemplate employing the windshield protective device described as an accessory attachment for vehicles, in which event it will take the form disclosed most clearly in Figures 6 and 7 wherein the construction is the same substantially in all respects to that described excepting that reference to the down-spout feature which in the preferred form was incorporated in the vehicle body construction itself. That is to say, instead of the down spouts 9′ I provide separate detachable spout members 9ª which are suitably fastened to the front of the vehicle body by the fastening means 9ᵇ and to which the shield protector supports 16 are connected as hereinbefore described. A very simple and desirable attachment is thus provided which will adequately protect the windshield and serve the function of a shade after the manner of devices for the latter purpose now in use.

Having thus described my invention, what I claim as new and desire to secure by Letters Patent is:

1. A drainage system for vehicles comprising a strip adapted to be secured to the vehicle top in position to project above the same, said strip having its edge rolled over to provide an overhanging flange.

2. In a drainage system for vehicle tops, the combination with a drip trough extending completely about the top of the body, of a windshield protector arranged at the front of the vehicle body and adapted to receive water from the top collected by the drip trough and convey it from the top, said windshield protector projecting in advance of the windshield to prevent the water from collecting upon said windshield.

3. In a vehicle drainage system the combination with a drip trough connected to the top to catch the water falling upon the surface thereof, of a windshield protector device arranged at the forward portion of the top and adapted to receive water from the top surface through the drip trough means, and down-spouts for conveying the water from the surface and from the protector to a point beneath the body.

4. In a vehicle drainage system of the class described, means for collecting water falling upon the surface of the top of the vehicle body and means for conveying the water therefrom, including a windshield protector device having supports constituting water conveying means.

5. A protector device for vehicle bodies comprising a vizor having means for catching water falling upon the surface thereof and supporting means for said vizor constituting a drainage means for the water collected thereby.

6. A vehicle attachment of the class described comprising a vizor adapted to be secured to the vehicle body to project in advance of the windshield thereof, water collecting means carried by said vizor and adjustable supports for said vizor, said supports constituting the drainage means for the surface of the same.

7. An automobile attachment of the class described comprising a protector shield or vizor pivotally connected to the top of a vehicle so as to project in advance of the windshield thereof, trough means arranged about the edges of said shield, a tubular support for said shield constituting water conveying means, and a spout member to which said support is connected and with which the support communicates to convey the water from the shield to a point relatively distant therefrom.

In testimony whereof I affix my signature.

LEONARD CHARBONNEAU.